United States Patent [19]

Pleva

[11] Patent Number: 5,072,917

[45] Date of Patent: Dec. 17, 1991

[54] UNIFORM LOADING SPRINGS OF IMPROVED CONFIGURATION

[76] Inventor: Walter F. Pleva, 263 Sand Pine Rd., Indialantic, Fla. 32903

[21] Appl. No.: 197,321

[22] Filed: May 23, 1988

Related U.S. Application Data

[63] Continuation-in-part of Ser. No. 52,066, May 21, 1987, abandoned.

[51] Int. Cl.$^5$ ............................................... F16F 1/34
[52] U.S. Cl. .................................... 267/162; 267/161; 411/162
[58] Field of Search ................ 267/161, 162, 47; 411/760, 162, 544, 545

[56] References Cited

U.S. PATENT DOCUMENTS

| | | | |
|---|---|---|---|
| 491,173 | 2/1893 | Hayward | 411/162 |
| 2,034,258 | 3/1936 | Hausser | 411/162 |
| 2,069,402 | 2/1937 | Cowlin | 411/162 |
| 2,179,575 | 11/1939 | Hosking | 411/162 |
| 2,744,733 | 5/1956 | Cliborn | 267/161 |
| 3,481,381 | 12/1969 | Black | 411/162 |

FOREIGN PATENT DOCUMENTS 2298039 8/1976 France ........................... 267/162

Primary Examiner—Matthew C. Graham
Attorney, Agent, or Firm—Julian C. Renfro

[57] ABSTRACT

The springs in accordance with this invention comprise flat, double surfaced components of resilient, flexible material, which components have an equal number of uniform projections or protrusions on each side. The protrusions or projections are rounded or generally spherically shaped, and equally spaced one from another, with the protrusions on one surface of the flat component being precisely intermediate the protrusions on the other surface. Where protrusions are formed by a press which forms a dent in one surface, dents and protrusions alternate on each surface, whereas the side or surface of the component opposite each solid protrusion is flat. The springs are controlled by simple beam deflection. They are inexpensive to produce and may be employed in numerous systems to minimize friction, overheating, stress, fatigue or deformation, damp oscillations or vibrations and maintain alignment.

2 Claims, 3 Drawing Sheets

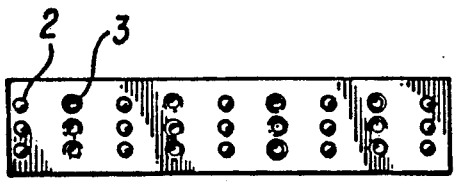
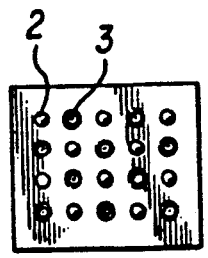
FIG.6  FIG.7
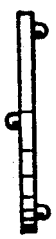 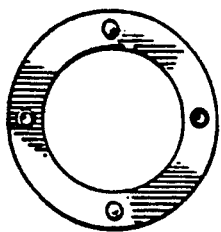  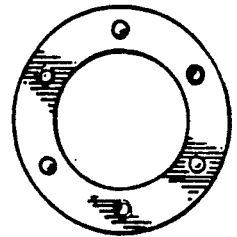
FIG.8a  FIG.8b  FIG.9a  FIG.9b
 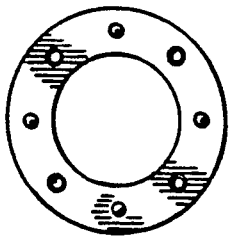  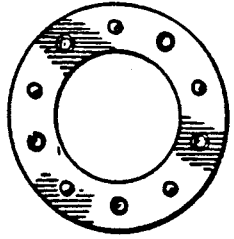
FIG.10a  FIG.10b  FIG.11a  FIG.11b
  
FIG.12  FIG.13  FIG.14

UNIFORM LOADING SPRINGS OF IMPROVED CONFIGURATION

CROSS-REFERENCE TO RELATED APPLICATION

This invention may be regarded as a Continuation-in-Part of my earlier patent application entitled "Uniform Loading Springs," Ser. No. 052,066, filed May 21, 1987, which is abandoned with the filing of this application, and all of the significant teachings of that application are to be understood to be incorporated into this application.

BACKGROUND OF THE INVENTION

This invention relates to uniform loading springs which may be included in a category with springs described generally as leaf springs, diaphragm springs, suspension springs or the like that form a cushion or loadbearing device. The springs of this invention may be employed in a wide variety of systems and can r eplace existing washers and springs such as wavy spring washers, curved spring washers, compression spri ngs and precision washers as well as lockwashers and the springs noted above. The instant springs are controlled by simple beam deflection.

In the past, a number of devices have been proposed that some similarity to the instant invention, but in every instance, there is a substantial distinction to be noted. In U.S. Pat. No. 2,179,575 to Hosking, entitled "Lock Washer," it is to be seen that the patentee described a device having a plurality of projections or locking elements which project from opposite sides of the washer body, and it is to be realized that such projections may include corners or edges that define sharp work e ngagi ng co rners o r edges that adapted to firmly embed themselves within the surface of the work piece, such as a screw head or nut. In other words, Hosking encourages his lock washer to engage the adjacent member, such as the underside of a screw head or a nut, in a scraping or scarring manner, so as "to effectively secure the nut against retrograde movement."

As will be seen, an object of this invention is to provide springs which have unlimited versatility, providing uniform spring loading, compression and flexibility under variable environmental conditions, without damage to adjacent members. My springs are designed with the objective of minimizing friction and overheating, shear, stress, fatigue or deformation, reducing noise levels, and damping oscillations or vibrations. Another objective is to reduce weight and bulk and enhance load capacity compared to existing springs employed for comparable jobs.

Existing lockwashers are typically loaded at one or sometimes several points, which causes shearing, scarring or other damage to the screw or base of the metal. If washers are used on both sides of the ordinary lockwasher, however, there is a tendency to loosen under vibration. Thus, another object of this invention is to prevent such vibrations, while avoiding undesirable qualities such as metal fracture, scarring and chipping. This makes my invention most valuable in "clean rooms."

Many spring systems and designs have failed because of lack of uniform loading and maintenance of alignment in many areas, such as bearings and optical precision instruments, due to temperature changes, stress, humidity, atmospheric pressure and other environments that may cause critical variations. In bearing designs proper alignment and adjustment of the ball track is very important to prevent skidding and noise and to increase beari ng life. In optical and other precision instruments, such as those employed in outerspace, maintenance of uniform loading, provision for expansion and contraction, reduction of stress, prevention of deformation, damping of vibrations or oscillations are vital to proper and successful performance.

Presently available wavy washers cannot be fabricated for sensitive uniform loading because of their configuration. The wavy portion on each contact segment is not equal and has a different spring rate. Twisting taking place on each contact segment causes undue stress which does not permit the material to return to its original position. This may be considered to be based upon structural fatigue. Belleville spring washers have similar problems because of buckling. Deformation or fracture of the spring can destroy the entire system in which it is employed.

SUMMARY OF THE INVENTION

A spring in accordance with this invention may comprise a flat, flexible, resilient, double surfaced component having the same number of uniform protrusions on each surface, each adjacent pair of protrusions being equidistant from each other and being substantially spherical in shape so as to be usable as multiple fulcrums. The generally spherical protrusions on one surface are usually precisely intermediate the generally spherical protrusions on the other, such that no protrusion on the one surface is exactly opposite a protrusion on the other surface. My novel spring is flat in an unstressed state, and when placed under stress between adjacent members that are in contact with the protrusions, it is capable of undertaking flexure in the manner of simple beam bending between the protrusions, the amount of flexure in each instance being in accordance with the amount of stress applied.

One embodiment of my spring is of annular configuration, having a central hole into which components associated with the adjacent members may extend.

Another distinct embodiment of my invention involves a spring in which the flat, flexible, resilient, double-surfaced material is of rectangular or square configuration.

In accordance with either of these principal embodiments, sandwich construction may be utilized, involving the use of a pluralit y o f annularly shaped members or a plurality of rectangularly shaped members used in a stack.

In a sandwich co nstruction in accordance with this invention, there is flat spacer to separate the various components, which spacer can be positioned in any orientation without affecting performance. As an alternative, there may be at least two annular, or at least two rectangularly shaped springs sandwiched together, each comprising spring-spacer-spring and combined to form a set of springs.

As to the protrusions I utilize, in some instances they may be hollow, generally spherically formed contact points, each usable as a fulcrum, with protrusions alternating on each surface. As an alternative, the protrusions may be solid and generally spherically configured or rounded so as to be usable as fulcrum contact points, with the surface opposite each protrusion being flat.

The springs of my invention may thus be seen to basically comprise double surfaced flat materials, such as metal disks or washers, having uniform projections or protrusions on both sides. Such projections or protrusions alternate with generally flat areas and must be centered and equally spaced so that a rounded protrusion on one side is precisely centered opposite a flat area on the other side. In other words, the protrusions on one surface are intermediate the protrusions on the other surface. Therefore, the rounded protrusions are equally spaced from one another on each side of the spring, and equally spaced from the edge of the spring base.

The quantity of protrusions should be of equal number and usually of the same size and configuration on each side of the spring. There may be one or more rows of protrusions. Under some circumstances, however, the rounded protrusions on one side may have a different size or configuration than those on the other side, depending upon the system in which the spring is employed.

Uniform loading is achieved by the structure and by the symmetry of the spring. For most uses, the preferred structure h as a mini mum of three rounded or generally spherical protrusions on each side of the spring. However, two protrusions on each side may be quite satisfactory when employed in some systems, such as lockwashers.

Where the protrusions are formed by a press which forms a dent in one surface and a protrusion on the opposite surface, dents and protrusions alternate on each surface. In the case of a circular spring, the dents and protrusions would be placed on the circumference of a circle which is coaxial with the actual circumference of the spring. The spring would usually be annular with a hole in the middle as shown in the drawings.

The advantage of having these uniformly spaced, rounded protrusions can best be understood by an explanation of the operation of the spring. When a spring is placed between two adjacent members, such as flat elements, each of the protrusions on one side would contact the first element and each of the protrusions on the other side would contact the second element. Where the protrusions are all of the same size, the tops of the rounded protrusions on one side are in a plane which is parallel to the plane determined by the tops of the rounded protrusions on the other side of the spring.

When the contacting elements or adjacent members are barely touching the protrusions, the spring is unstressed. When the device in which the springs are used is assembled, the connection between the contacting elements and the spring is tightened so that the spring is under some stress. When this happens, the spring bends between the protrusions in the manner of a beam of resilient material, and the elements are held firmly in place by the preloading stress. This is particularly exemplified in FIG. 18, discussed hereinafter, which reveals a differential spring system. Even when compressed the spring base 1 should float and not contact the housing, except in instances where there may be only two protrusions on each side and the spring is used in the general manner of a lockwasher, but without the damage to adjacent members usually caused by a lockwasher.

If the device under stress is move d to a different environment, involving changes in atmospheric pressure or changes in temperature or humidity which cause expansion or contraction of any elements of the device, the consequent expansion or contraction of elements will either increase or decrease the flexure of the spring accordingly. A tight fit will be maintained and the parallelism of the elements will also be maintained.

The compensatory effect of the springs can be made even with extreme changes in atmospheric conditions. For example, a camera sent from earth to outer space would encounter a variety of extreme conditions. The springs of my invention can also compensate for the changes between dissimilar elements such as between glass and metal or between different metals. No known prior art spring can provide such uniform compensation.

The instant springs may be fabricated in any size or configuration. Depending upon the particular use, springs may be circular, oblong, oval, rectangular, etc. The protrusions may be rounded or generally spherical, so as to act as non-damaging fulcrums in conjunction with the basic flat member of the device. My rounded protrusions or fulcrums can be manufactured as solid or hollow forms.

Further, my novel springs may be manufactured by various inexpensive means and fabricated of various metals, such as spring or stainless steels, or the newer exotic metals or materials or combinations thereof as well as polymeric or synthetic materials as may be desirable depending upon the conditions and purposes. The materials should have spring memory and not plastic deformation. In other words, the spring materials I use have resilient qualities. Loads may be varied by using different type, weight, thickness or stiffness of materials.

The entire spring with its rounded protrusions may be cast in molds, or projections may be made and then riveted, brazed, welded, etc., to both spring surfaces. Another means of making protrusions is to stamp the spring material with a die of predetermined size and configuration to form a hollow, carefully rounded member, with a dent on the side opposite. Rounded, generally spherical protrusions are then formed on both sides of the spring in such a manner that they alternate with dents at equidistant intervals.

The springs of this invention may be nested or ganged to produce combinations of springs or springs and washers or spacers. Such multiple combinations provide accurate loading with less sensitivity to load change due to expansion or contraction responding to environmental forces. These combinations can be used in power packs, spring drives, dynamic oscillators, differential springs, etc. They can change frequency and resonance in vibration systems. Also, they may be employed in bimetallic compensation networks, shock absorbers, and friction clutches.

As will now be clear, a principal object of this invention is to provide highly satisfactory springs at reasonable cost, which have unlimited versatility, providing uniform spring loading, co mpression a nd flexibi lit y under varia ble environmental conditions. My springs are designed with the objective of minimizing friction and overheating, shear, stress, fatigue or deformation, reduce noise levels, and damp oscillations or vibrations. Another objective is to reduce weight and bulk and enhance load capacity compared to existing springs employed for comparable jobs.

Another object of this invention is to provide springs readily able to be configured to be quite sensitive, such that the springs will provide the precise loads needed by design engineers.

Still another object of this invention is to maintain alignment of parts of precision instruments under variable conditions. Thus, a further object of the invention is to reduce the cost of manufacturing precision instruments. By employing the springs of this invention in such instruments, tedious refinements and adjustments by machining to precise requirements with extreme accuracy may be obviated by the action provided by these springs in correcting machining error. The uniform loading of the instant springs can take up the tolerance error, providing more uniform compensation for machini ng slightly out of square to the machine face be adjusted with the springs of this invention.

BRIEF DESCRIPTION OF DRAWINGS

FIG. 6 is the top or bottom plan view of a linear strip spring section in accordance with a rectangular embodiment of this invention, showing one arrangement of protrusions;

FIG. 7 is the top or bottom view of another arrangement of protrusions on a linear spring section, this particular embodiment being of square configuration;

FIG. 8a is a side view of a round spring having two rounded protrusions;

FIG. 8b is a top or bottom view of the spring of FIG. 8a;

FIG. 9a is a side view of a round spring having three rounded or generally spherical protrusions;

FIG. 9b is the top or bottom view of the round spring with three protrusions.

FIG. 10a is a side view of a round spring having four rounded protrusions.

FIG. 10b is the top or bottom view of the round spring having four protrusions;

FIG. 11a is the side view of a round spring having five rounded protrusions;

FIG. 11b is the top or bottom view of the spring having five protrusions;

FIG. 12 is a side view of the spring having open protrusions.

FIG. 13 is a side view of solid, rounded protrusions on a cross section of a spring;

FIG. 14 is a side view of a spring with a cut awa y section showing a rounded protrusion riveted to the surface;

DETAILED DESCRIPTION OF PREFERRED EMBODIMENTS

Figure 1:
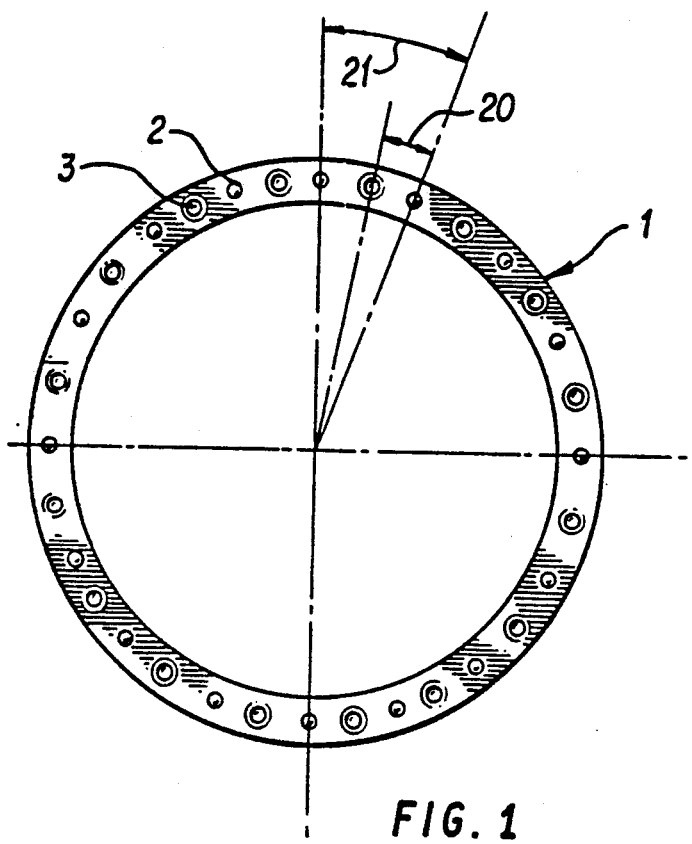
FIG. 1 shows the top or bottom plan of a circular spring in accordance with this invention.

Referring to FIG. 1, there is depicted a round or annularly shaped spring having an equal number of projections or rounded protrusions 2 on both sides of the spring base or component 1 as well as an equal number of depressions 3. Lines 20 indicate the equidistance between depression and rounded protrusion, while lines 21 show an equidistance between rounded protrusions forming equal angles in the circular spring.

Figure 2:
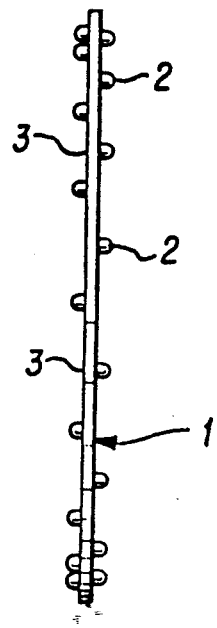
FIG. 2 is a side view of the circular spring of FIG. 1.

FIG. 2 is essentially the spring of FIG. 1, in a side view. The quantity of protrusions 2 are limited only by the material selected for the spring base 1 and fatigue thereof. (Modulus of Elasticity). I prefer for the protrusions to be generally rounded, or as being generally spherical in shape, for such protrusions are to be regarded as multiple fulcrums, with the spring base between protrusions undertaking flexure in the manner of beam bending as load is applied.

Unlike lock washers, which may desirably dig into and deface the components used therewith in the interests of reducing the tendency of the components to loosen, my springs are carefully configured to avoid injuring or defacing adjacent components.

Figure 3:
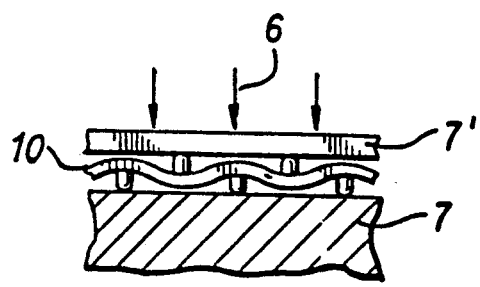
FIG. 3 is a side view, partially in section and to a larger scale, with spring deflection under load applied by adjacent members showing simple beam loading.
Figure 4:
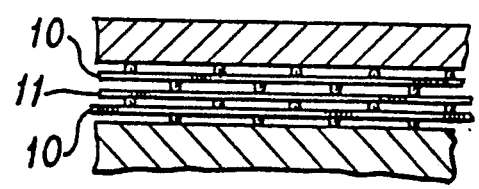
FIG. 4 is a cross sectional side view of a combination of springs and washers or spacers in free form.

Stiffness of the springs 10 depicted in FIGS. 3 and 4 can be increased or decreased as symmetrical projections 2 are increased or decreased using the. same spring base thickness. The thickness, preferably from 0.0005 inches and up, may vary depending upon materials employed, intended use and load upon the spring. Thus, stiffer or softer springs may be manufactured dependi ng upon the thic kness as well as the number of projections or protrusions 2.

Elevation of the rounded projections 2 above the spring base 1 may be equal to the thickness of the spring base 1 or the elevation. may be more or less than the thickness of the spring base. Again the size, shape and dimensions may be designed for a particular use or system by those skilled in that particular art employing the teachings of the instant disclosure.

It is important to realize that my novel springs can be configured to be quite sensitive, such that the springs will provide the precise loads needed by design engineers. My springs may be placed in a wide variety of usages, such as in optical devices, various items of machinery, clutches, bearing arrays, and the like, and as will be seen hereinafter, my springs may quite advantageously be used in stacked or "sandwich" arrays, with s uita ble spacer members used therebetween.

FIG. 3 shows the deflection of a single spring under a load 6 and housing 7, while FIG. 1 and FIG. 2 show springs in a free state and not deflected. I may hereinafter refer to the load and the housing as adjacent members that serve to place the spring components under stress. Depending upon selection of spring materials and deflection characteristics, contact point friction may be reduced to a minimum. In any case, for proper function, the spring base 1 should not rest upon the sides of the unit.

Springs 10 may be combined, as shown in FIG. 4, with spacers or washers 11 sandwiched between two or more springs. Depending upon load and use, spring 10 may be one spring, or stac ked two or more springs as in FIG. 5. This allows acurate loading with less sensitivity to load changes due to such environmental factors as temperature or pressure.

In the spring sandwiches, however, the protrusions on one spring need not be aligned with protrusions on the spring on the other side of the washer or spacer. Nor do the springs on both sides necessarily have to have the same number or form of protrusions unless they are ganged as in FIG. 5. Just as the thickness and weight of the springs may vary, so too may that of spacers or washers. These combinations are of particular use in differential systems, see FIG. 18.

Figure 5:
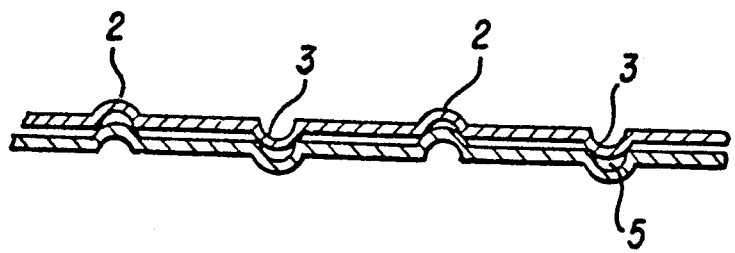
FIG. 5 is a side view to a comparatively large scale of stacked springs, in free form.

As noted above, the stacking or nesting of springs is shown in FIG. 5. The protrusions or projections 2 of one spring may fit into the depressions 3 of a parallel spring. For best results, as in, for example, precision instruments, the fit should be as precise as possible. However, because the outer circumference of the round protrusion, for example, is larger than the inner dent, there may be a small space 5 between the springs.

Stacked springs can be used to increase loads where applicable and allow more flexibility in deflection. Thus, the spring combinations should be employed where, under some conditions and with some materials, employing a single spring 10 may result in overstressing.

The springs of this invention may be manufactured in linear forms and have a variety of arrangements of protrusions and depressions, examples of which are shown in FIG. 6, wherein a rectangular configuration is depicted, and in FIG. 7, where the spring is substantially square. Hereinafter when I refer to my springs as being of rectangular configuration, that is intended to include square springs, for a square is of course a rectangle having four equal sides.

Figure 15:
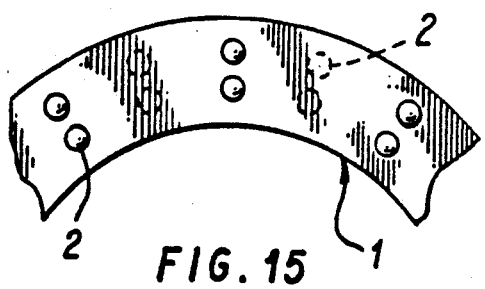
FIG. 15 is a section of a spring having two rows of round protrusions.
Figure 16:
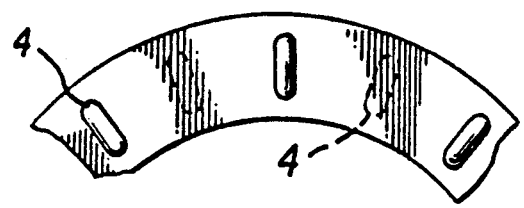
FIG. 16 is a section of a spring having a row of elongate protrusions.

Other arrangements of springs and protrusion shapes may be employed in accordance with this invention, such as are to be seen in FIG. 15 and FIG. 16. FIG. 15 shows two rows of round or generally spherical protrusions 2, and indicates in hidden detail —2, where they are in solid form, not having dents opposite the protrusions. FIG. 16 shows oblong or elongated solid protrusions 4, and in hidden detail —4.

FIGS. 8a, 8b, 9a, 9b, 10a, 10b, 11a and 11b show two views of round (annular) springs with each having an equal number of protrusions and dents on each side of the spring, the "a" view representing the side view, and "b" showing a top or bottom view. FIG. 8b shows two protrusions and two dents, FIG. 9b has three protrusions and three dents, FIG. 10b has four of each, while FIG. 11b has five of each.

FIGS. 13 and 14 show various arrangements of protrusions and depressions and different configurations of same. In FIG. 13 cross section, protrusions of rounded or generally spherical configuration may be prepared by welding and soldering solid forms or by casting. However, hollow forms may be welded or soldered to cover uniform holes in a spring base. In FIG. 14, the rounded, generally spherical protrusions are held by rivet means to the spring base.

Figure 17:
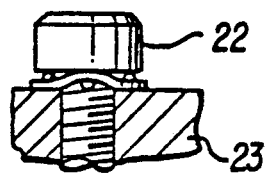
FIG. 17. is a cut away section of a spring lock mounted under the head of a screw.

FIG. 17 shows a spring 10 mounted under a screw 22 to form a locking device. This can prevent excess torque that may cause chipping or fracture. The uniform loading spring under the head of the screw will maintain spring tension, th us preventing the screw from rotating. The housing 23 can be any material such as wood, metal, etc. in which the screw 22 may be locked. As previously mentioned, however, my device in using rounded, substantially spherical protrusions does not injure or mar the surfaces of the adjacent members between which they are used.

Figure 18:
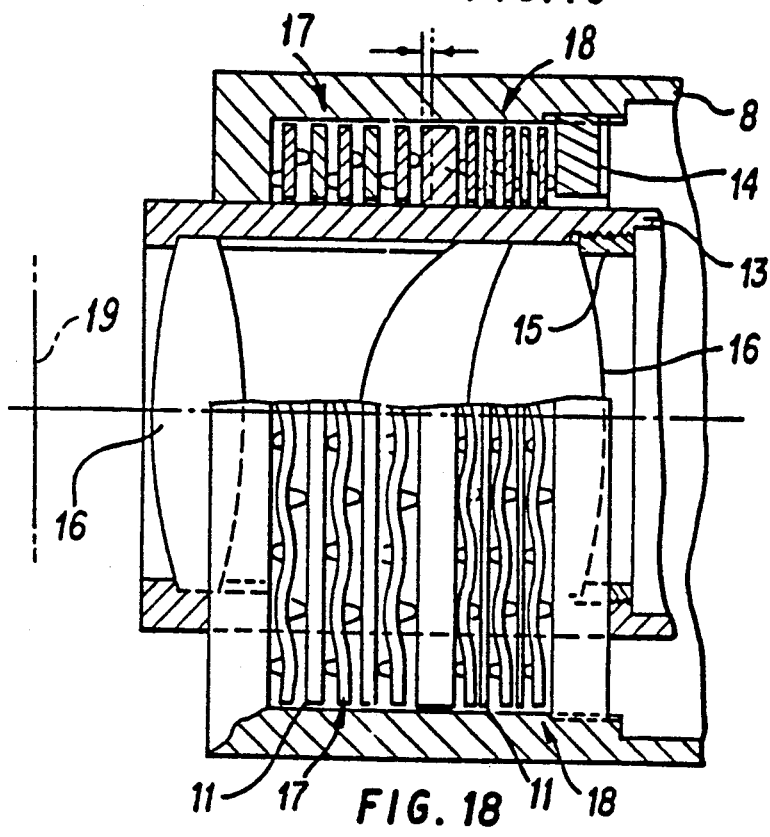
FIG. 18 is a view of an optical system with a partial cut away enlargement of the differential spring system.

Another example of an application of the springs of this invention is illustrated in FIG. 18. The differential spring system represents one of the most advantageous and efficient use of the springs of this invention. As shown in FIG. 18, an op tical system which may be subject to displacement or differential changes due to temperature, atmospheric pressure, vi bration, etc. ma y be controlled with a differential arrangement involving a set of heavy springs 17 and a set of light springs 18. If the springs on both sides were the same, the displacement would be zero.

As set forth in the enlarged partial cut away area in FIG. 18, these loaded springs have spacers 11 set between the springs. The optical system as in FIG. 18 may include an outer housing 8, an inner housing 13, a nut 14 and a bezel 15. The optics 16, usually glass or plastic, may be adjusted or moved by the springs to compensate for variations without the necessity of expensive motorized equipment as is sometimes necessary with other systems. These differential springs can be used in many applications such as compensation networks for expansion and contraction.

Figure 19:
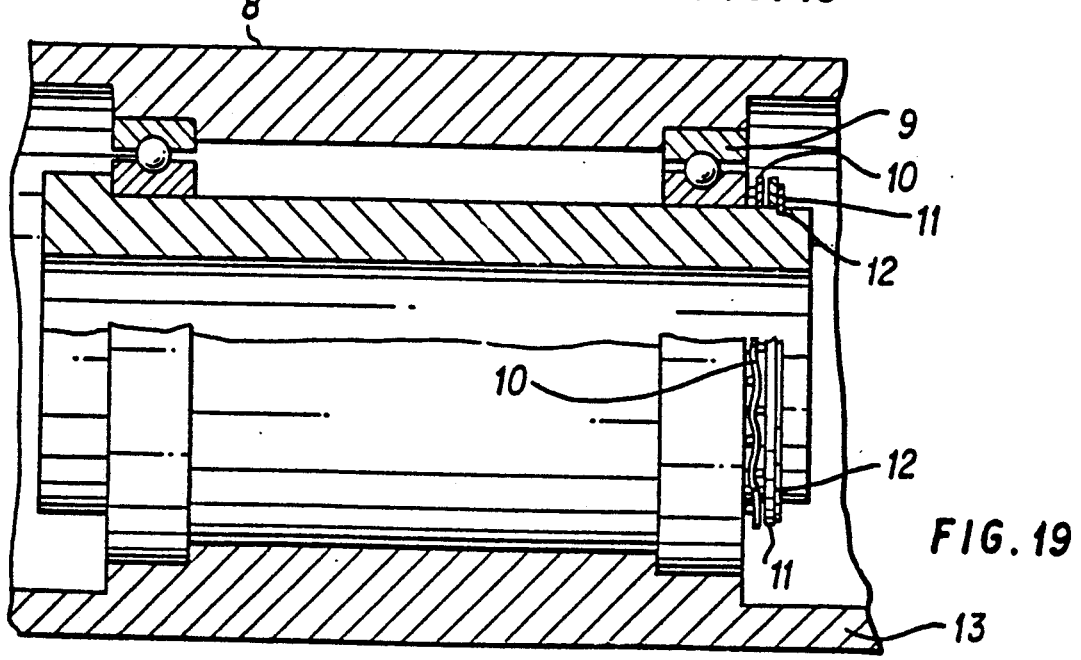
FIG. 19 is a ball bearing system with a partial cut away enlargement of the adjusting spring.

FIG. 19 represents precision ball bearings with outer housing 8 and inner housing 13, with this view revealing the ball bearing 9 having a spring 10 in accordance with this invention attached in an operative relationship therewith. This particular system includes a spacer 11 and retaining ring 12, latter being firmly attached to the inner member 13. The somewhat enlarged partial cut away section shows a preload spring system.

It should now be clearly understood that the flat member of resilient material I use in my springs undertakes a form of beam bending when the spring has been placed under stress from adjacent members in contact with the rounded protrusions. Quite advantageously, the rounded protrusions act, when the beam has been fully deflected, as a stop that prevents overstressing of the spring.

While the invention has been particularly shown and described with reference to the preferred embodiments, it will be understood by those skilled in the art that the foregoing are merely illustrative and that changes in form and detail may be ma de wit hout departing from the spirit and scope of the invention.

I claim:

1. A spring able to be utilized between two adjacent components, without scarring or defacing either such component, comprising a flat, flexible, resilient, double surfaced component having the same number of uniform, symmetrically shaped protrusions on each surface, each adjacent pair of protrusions being equidistant from each other and being substantially spherical in shape so as to be usable as multiple fulcrums, the substantially spherical protrusions on one surface of said component being precisely intermediate the substantially spherical protrusions on the other surface, such that no protrusion on the one surface is exactly opposite a protrusion on the other surface, said component being flat in an unstressed state and when placed under stress between adjacent members that are in contact with said protrusions, capable of undertaking flexure in the manner of simple beam bending between such protrusions, with the force of the spring increasing by the number of protrusions utilized, the spring further utilizing sandwich construction, involving the use of a plurality of annularly shaped members used in a stack, where the protrusions are hollow, with the hollow protrusions of one component fitting within the protrusions of the adjacent component, with such stacking increasing the force of the spring, in proportion with the number of springs utilized.

2. A spring able to be utilized between two adjacent components, without scarring or defacing either such component, comprising a flat, flexible, resilient, double surfaced component having the same number of uniform, symmetrically shaped protrusions on each surface, each adjacent pair of protrusions being equidistant from each other and being substantially spherical in shape so as to be usable as multiple fulcrums, the substantially spherical protrusion on one surface of said component being precisely intermediate the substantially spherical protrusions on the other surface, such that no protrusion on the one surface is exactly opposite protrusion on the other surface, said component being flat in an unstressed state and when placed under stress between adjacent members that are in contact with said protrusions, capable of undertaking flexure in he manner of simple beam bending between such protrusions, with the force of the spring increasing by the number of protrusion utilized, said flat, flexible, resilient, double-surfaced component being of rectangular configuration, the spring further utilizing sandwich construction, involving the use of a plurality of rectangularly shaped members used in a stack, where hollow protrusions of one member fit within the protrusions of the adjacent member, and with the stacking increasing the force of the spring with each additional spring added.

* * * * *